US009541771B2

(12) United States Patent
Johnson

(10) Patent No.: US 9,541,771 B2
(45) Date of Patent: Jan. 10, 2017

(54) DUAL-FOLDING EYEGLASSES AND EYEGLASS COLLAPSIBLE CASE

(71) Applicant: MICROVISION OPTICAL, LLC, San Diego, CA (US)

(72) Inventor: David A. Johnson, Solana Beach, CA (US)

(73) Assignee: MICROVISION OPTICAL, LLC, San Diego, CA (US)

( * ) Notice: Subject to any disclaimer, the term of this patent is extended or adjusted under 35 U.S.C. 154(b) by 0 days.

(21) Appl. No.: 14/984,545

(22) Filed: Dec. 30, 2015

(65) Prior Publication Data

US 2016/0246070 A1  Aug. 25, 2016

Related U.S. Application Data

(60) Provisional application No. 62/119,268, filed on Feb. 23, 2015.

(51) Int. Cl.
G02C 5/08 (2006.01)
G02C 5/22 (2006.01)
G02C 5/00 (2006.01)
G02C 5/10 (2006.01)

(52) U.S. Cl.
CPC ............ G02C 5/2263 (2013.01); G02C 5/006 (2013.01); G02C 5/10 (2013.01); *G02C 2200/28* (2013.01)

(58) Field of Classification Search
CPC ............................... G02C 5/2209; G02C 5/08
USPC ................................................. 351/63; 2/454
See application file for complete search history.

(56) References Cited

U.S. PATENT DOCUMENTS

| 4,820,035 | A | * | 4/1989 | Kanda | ................ | G02C 5/006 351/113 |
| 5,028,126 | A | | 7/1991 | Takeuchi | | |
| 5,187,504 | A | * | 2/1993 | Kanda | ................ | G02C 5/10 351/128 |
| 5,208,616 | A | | 5/1993 | Chang | | |
| 5,231,429 | A | * | 7/1993 | Kanda | ................ | G02C 5/006 351/118 |
| 5,448,317 | A | | 9/1995 | Huang et al. | | |
| 5,473,395 | A | | 12/1995 | Huang | | |
| 5,638,146 | A | * | 6/1997 | Nannini | ................ | G02C 5/006 16/228 |
| 5,640,218 | A | * | 6/1997 | Kanda | ................ | G02C 5/006 2/454 |

(Continued)

*Primary Examiner* — Hung Dang
(74) *Attorney, Agent, or Firm* — Procopio, Cory, Hargreaves & Savitch LLP; Noel C. Gillespie

(57) ABSTRACT

Embodiments of this patent disclosure provide for eyeglasses with multiple set of hinges for folding into a compact configuration to be fitted inside a compact case for easy storage and carrying. In one aspect, a pair of foldable eyeglasses having multiple set of hinges is disclosed. The eyeglasses include a frame surrounding a pair of lenses, and a pair of temples each of which extending from an outer edge of the frame, and the eyeglasses are in an unfolded configuration when the eyeglasses is being worn by a user. The eyeglasses also include a horizontal hinge positioned on each temple for folding the pair of temples horizontally from the unfolded configuration toward the frame into a first folded configuration. The eyeglasses additionally include a vertical hinge positioned on each temple for folding the pair of temples vertically from the first folded configuration toward the frame into a second folded configuration.

17 Claims, 9 Drawing Sheets

(56) References Cited

U.S. PATENT DOCUMENTS

| | | | |
|---|---|---|---|
| 5,751,393 A * | 5/1998 | Yamazaki | G02C 5/2227 351/119 |
| 5,760,867 A | 6/1998 | Pernicka et al. | |
| 6,494,573 B1 * | 12/2002 | Huang | G02C 5/006 2/454 |
| 6,513,926 B1 * | 2/2003 | Kizu | G02C 5/006 2/454 |
| 7,070,273 B2 | 7/2006 | Benavides et al. | |
| 7,455,402 B2 | 11/2008 | Gerber et al. | |
| 2011/0228210 A1 | 9/2011 | Willett | |

* cited by examiner

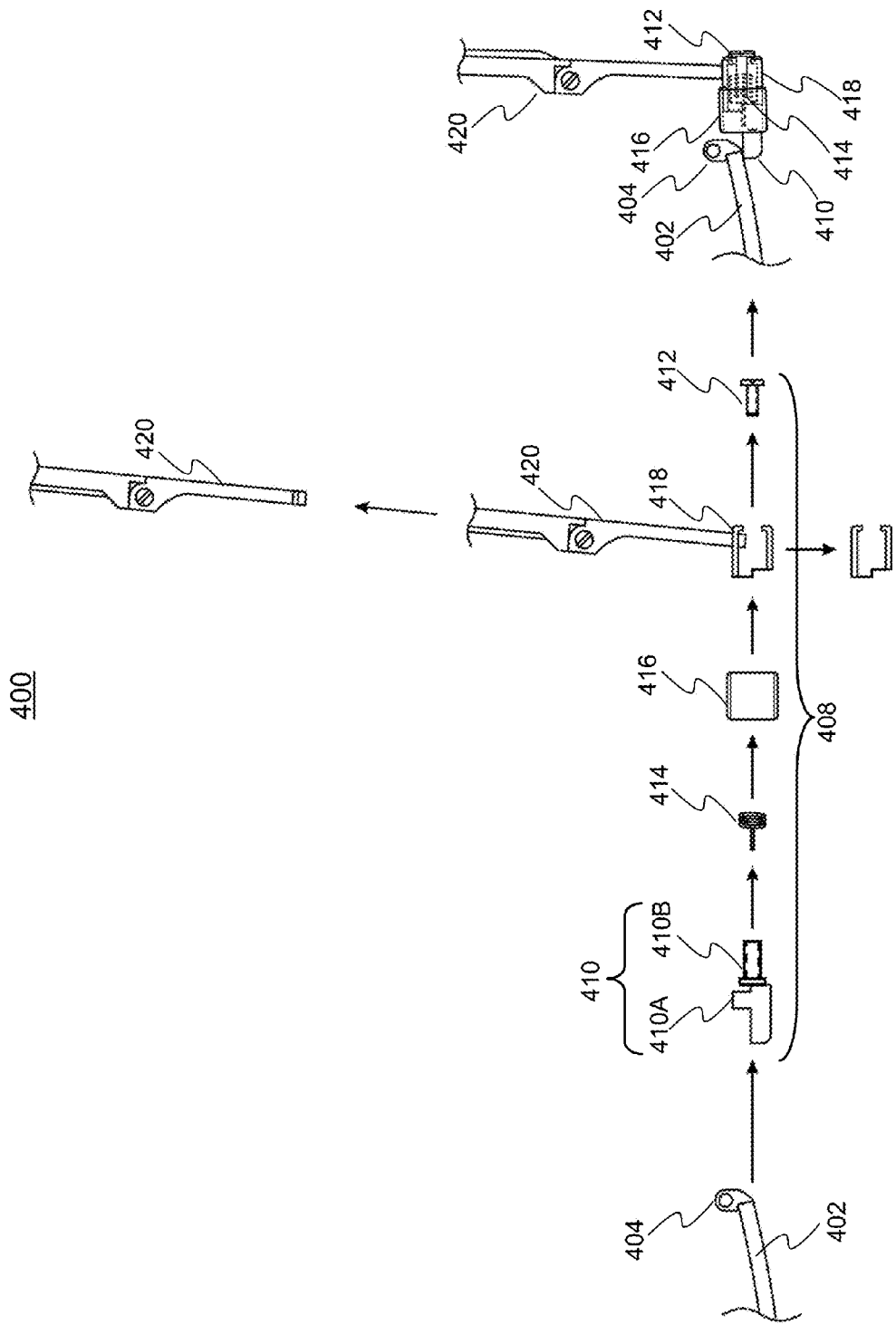

DUAL-FOLDING EYEGLASSES AND EYEGLASS COLLAPSIBLE CASE

PRIORITY CLAIM AND RELATED PATENT APPLICATIONS

This patent document claims priorities to and benefits of U.S. Patent Application No. 62/119,268 entitled "DUAL-FOLDING EYEGLASSES AND EYEGLASS COLLAPSING CASE" and filed on Feb. 23, 2015. The disclosures of the above application are incorporated by reference in their entirety as a part of this document.

TECHNICAL FIELD

This patent document relates to designs of eyeglasses with multiple sets of hinges which can be folded into an ultra-compact configuration. More specifically, some embodiments described herein relate to eyeglasses with two set of hinges which fold temples of the eyeglasses downward and inward such that the eyeglasses are configured to be collapsed into an ultra-compact configuration when a case is closed over the eyeglasses.

BACKGROUND

When not being worn, eyeglasses are generally folded at the temples via a pair of hinges near the frame of the eyeglasses that folds each temple horizontally toward the frame. This creates a smaller profile of the eyeglasses than when the eyeglasses are in their unfolded configuration to be worn by a user. However, this conventional folded configuration remains relatively thick and therefore also requires a relatively thick eyeglasses case for storage. Such an eyeglasses case is generally bulky and not easily stored on a person, such as inside a cloth pocket, or in a small personal bag.

Therefore, there is a need for eyeglasses designs which allow a pair of eyeglasses to be folded more compactly and fitted into a more compact case.

SUMMARY

Embodiments described herein provide for eyeglasses with multiple set of hinges for folding into a compact configuration, and more specifically to two pair of hinges which fold temples of the glasses downward and inward such that they are configured to be collapsed into the compact configuration when a case is closed over the eyeglasses.

In one aspect, a pair of foldable eyeglasses having multiple set of hinges is disclosed. The foldable eyeglasses include a frame surrounding a pair of lenses, and a pair of temples each of which extending from an outer edge of the frame, and the pair of eyeglasses is in an unfolded configuration when the pair of eyeglasses is being worn by a user. The foldable eyeglasses also include a horizontal hinge positioned on each temple of the pair of temples for folding the pair of temples horizontally from the unfolded configuration toward the frame into a first folded configuration. The foldable eyeglasses additionally include a vertical hinge positioned on each temple for folding the pair of temples vertically from the first folded configuration toward the frame into a second folded configuration.

In some embodiments, the vertical hinge is positioned adjacent to the outer edge of the frame and between the horizontal hinge and the outer edge of the frame.

In some embodiments, the vertical hinge is configured to rotate around an axis which is substantially parallel to the plane of the frame and substantially perpendicular to the outer edge of the frame.

In some embodiments, each temple includes a first portion located between the horizontal hinge and the vertical hinge and a second portion extended beyond the horizontal hinge. The first portion is affixed to the vertical hinge and is substantially perpendicular to the axis of the vertical hinge.

In some embodiments, after folding the temples using the horizontal hinge into the first folded configuration, the second portion of the temple is substantially parallel to the plane of the frame while the first portion of the temple remains unfolded.

In some embodiments, the first portion of the temple is configured with a length which is substantially equal to or greater than a distance between the axis of the vertical hinge and a bottom edge of the frame.

In some embodiments, folding the temples vertically from the first folded configuration toward the frame into the second folded configuration using the vertical hinge includes rotating the first portion of the temple around the axis of the vertical hinge by approximately 90 degrees.

In some embodiments, after folding the temples vertically using the vertical hinge into the second folded configuration, the first portion of the temple is substantially parallel to the plane of the frame while remains perpendicular to the axis of the vertical hinge.

In some embodiments, the vertical hinge includes a tension spring which is configured to keeps the first portion of the temple in an unfolded configuration even when the second portion of the temple is folded into the first folded configuration.

In some embodiments, the tension spring is configured to unfold the second portion of the temple from the second folded configuration to the unfolded configuration when a tension is removed from the tension spring.

In some embodiments, the vertical hinge forms at least a part of an endpiece of the eyeglasses which connects the outer edge of the frame to the temple of the eyeglasses.

In some embodiments, the foldable eyeglasses is operable to be placed inside a collapsible case which operates to fold the foldable eyeglasses from the first folded configuration into the second folded configuration by closing a lid of the collapsible case onto the partially folded temples of the foldable eyeglasses.

In another aspect, an endpiece of a pair of foldable eyeglasses for connecting an outer edge of a rim of the eyeglasses to a temple of the eyeglasses is disclosed. This endpiece includes a stationary part which is affixed to the outer edge of the rim of the eyeglasses. The endpiece also includes a rotatory part which is affixed to the temple of the eyeglasses and attached to the stationary part horizontally through an attachment mechanism. The rotatory part also includes a tension spring which inclines to keep the temple of the eyeglasses in an unfolded configuration when the eyeglasses are being worn by a user. Together, the stationary part and the rotatory part of the endpiece form a rolling hinge which is operable to fold the temple from the unfolded configuration vertically downward into a folded configuration such that the temple is substantially in the same plane as the rim of the eyeglasses.

In some embodiments, the stationary part further includes an attachment part for connecting the stationary part with the outer edge of the rim and a fastening part attached to the attachment part and containing a threaded borehole. The stationary part additionally includes a first cylindrical tube attached to the attachment part such that the fastening part is substantially inside and coaxial with the first cylindrical tube.

In some embodiments, the rotatory part further includes a second cylindrical tube attached to the temple of the eyeglasses at an outer surface of the second cylindrical tube. The tension spring of the rotatory part is substantially positioned inside the second cylindrical tube and in contact with the inner surface of the second cylindrical tube. This configuration causes the tension spring to rotate along with the second cylindrical tube. Moreover, the second cylindrical tube is substantially coaxial with the first cylindrical tube in the stationary part.

In some embodiments, the tension spring includes an extended end which is securely attached to the stationary part of the rolling hinge.

In some embodiments, the tension spring is attached to the stationary part of the rolling hinge by being fitted inside a grove cut into the surface of the fastening part of the stationary part.

In some embodiments, the second cylindrical tube has a diameter which is smaller than the diameter of the first cylindrical tube and greater than the diameter of the fastening part, wherein the second cylindrical tube is partially inserted into a gap between the first cylindrical tube and the fastening part.

In some embodiments, the attachment mechanism includes a screw which passes through the tension spring and the second cylindrical tube and threaded into the threaded borehole of the fastening part. This screw is coaxial with both the first cylindrical tube and the second cylindrical to facilitate the rotatory part of the rolling hinge to smoothly rotate around the stationary part of the rolling hinge.

In some embodiments, the head of the screw has a diameter greater than a diameter of an end opening of the second cylindrical tube so that the head of the screw is stopped by the end opening of the second cylindrical tube. In some embodiments, the head of the screw is substantially flushed with the surface of the end opening of the second cylindrical tube.

In some embodiments, the stationary part is affixed to the outer edge of the rim at the front side of the outer edge of the rim.

In some embodiments, the rolling hinge is operable to fold the temple from the unfolded configuration vertically downward into the folded configuration by rotating the rotatory part around the stationary part by approximately 90 degrees.

In some embodiments, the rim includes a rim lock.

In some embodiments, the rim does not include a rim lock.

In a further aspect, a foldable eyeglasses and collapsible case comprises: a set of eyeglasses comprising a frame surrounding a pair of lenses and temples extending from an outer edge of the frame; a horizontal hinge positioned on each temple for folding the temples horizontally toward the frame into a first collapsible position; a vertical hinge positioned on each temple for folding the temples vertically toward the frame into a second collapsible position; and a collapsible case which operates to fold the eyeglasses from the first collapsible position into the second collapsible position by closing a lid of the case onto the temples.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 4 illustrates an exemplary mechanical structure of the endpiece of a pair of proposed eyeglasses which includes a rolling hinge as part of the endpiece in accordance with one embodiment of the invention.

DETAILED DESCRIPTION

Figure 1A:
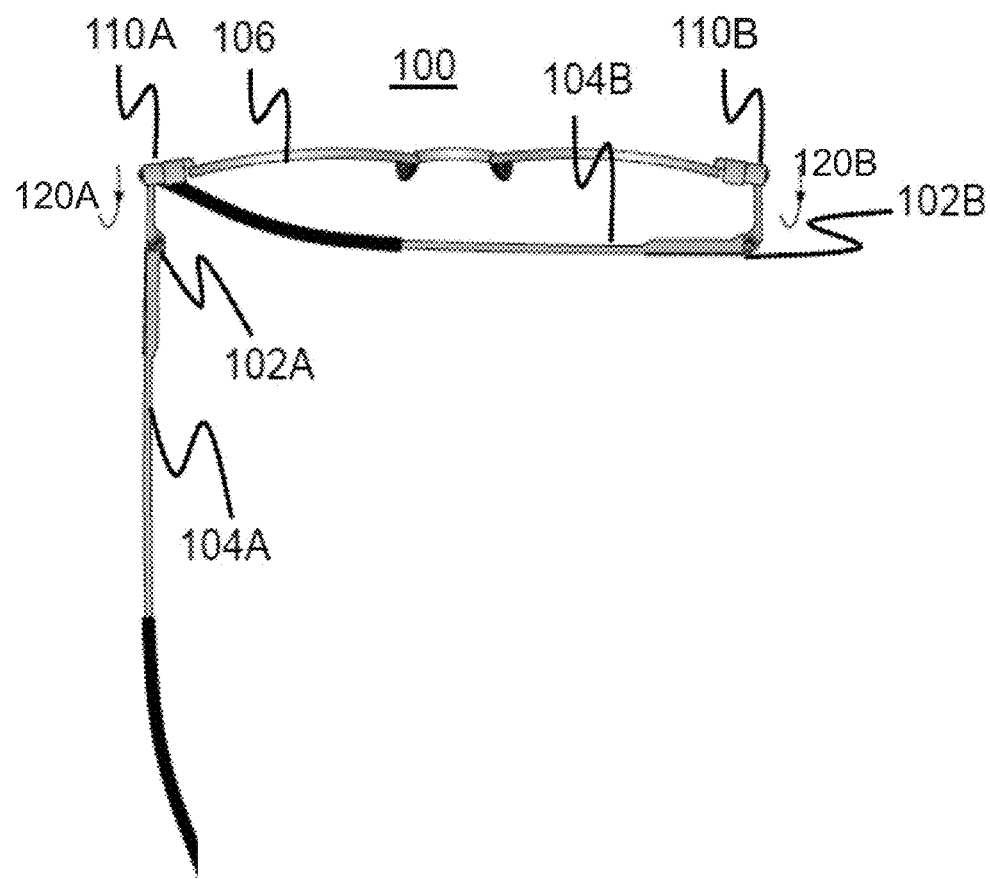
FIG. 1A shows a top-down view of a pair of foldable eyeglasses with temples being folded along a first set of hinges into a first folded configuration, in accordance with one embodiment of the invention.

Some embodiments disclosed herein provide for foldable eyeglasses with multiple sets of hinges for folding the eyeglasses into a compact configuration to be fitted inside a compact case for easy storage and carrying. In one aspect, the multiple sets of hinges include a first pair of hinges located within the temples and near the frame of the eyeglasses which folds the temples of the eyeglasses inward in a conventional folding manner. The multiple sets of hinges also include a second pair of "rolling" hinges located immediately adjacent to the rim of the eyeglasses which folds the temples of the eyeglasses downward toward the plane of the rim/frame and lenses. When both pairs of the hinges are engaged, the foldable eyeglasses are collapsed into a compact configuration which has a very thin profile to be fitted into an ultra-thin case.

In another aspect, the first pair of hinges may be engaged first to fold the temples of the eyeglasses into a conventional folded configuration, which is also referred to as a "first folded configuration," or a "partially-folded configuration." Next, the partially-folded eyeglasses are placed inside a case with the frame facing downward while the second pair of hinges remains unengaged. Next, the lid of the case is closed over the eyeglasses, which pushes on the temples of the eyeglasses. The applied pressure causes the second pair of hinges to engage so that the temples of the eyeglasses rotate and fold around the second pair of hinges into a fully-folded configuration (also referred to as a "second folded configuration") to allow the case to close and the eyeglasses securely stored inside the case.

In a further aspect, an endpiece of a pair of foldable eyeglasses for connecting an outer edge of a rim of the eyeglasses to a temple of the eyeglasses is disclosed. This endpiece includes a stationary part which is affixed to the outer edge of the rim of the eyeglasses. The endpiece also includes a rotatory part which is affixed to the temple of the eyeglasses and attached to the stationary part horizontally through an attachment mechanism, such as a screw. The rotatory part also includes a tension spring which inclines to keep the temple of the eyeglasses in an unfolded configuration when the eyeglasses are being worn by a user. The stationary part and the rotatory part of the endpiece form a rolling hinge which is operable to fold the temple from the unfolded configuration vertically downward into a folded configuration such that the temple is substantially in the same plane as the rim of the eyeglasses.

In some embodiments, the stationary part further includes an attachment part for connecting the stationary part with the outer edge of the rim and a fastening part attached to the attachment part and containing a threaded borehole. The stationary part additionally includes a cylindrical tube attached to the attachment part such that the fastening part is substantially inside and coaxial with the first cylindrical tube. The rotatory part further includes another cylindrical tube attached to the temple of the eyeglasses at an outer surface of the second cylindrical tube. The tension spring is substantially positioned inside the second cylindrical tube and in contact with the inner surface of the second cylindrical tube. This configuration causes the tension spring to rotate along with the second cylindrical tube. In some embodiments, the tension spring includes an extended end which is securely attached to the stationary part of the rolling hinge. Moreover, the second cylindrical tube is substantially coaxial with the first cylindrical tube in the stationary part.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Dual-Hinted Eyeglasses

Figure 1B:
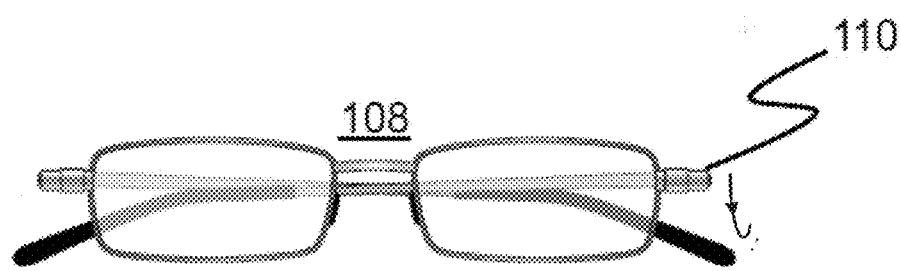
FIG. 1B shows a front view of the first folded configuration of the proposed eyeglasses when both of the temples are properly folded at the corresponding first set of hinges in accordance with one embodiment of the invention.

FIG. 1A shows a top-down view of a pair of foldable eyeglasses with temples being folded along a first set of hinges into a first folded configuration, in accordance with one embodiment of the invention. As illustrated in FIG. 1, the eyeglasses 100 include a first set of hinges 102 including a pair of hinges 102A and 102B located a short distance from the rim or frame 106 of the eyeglasses. Hinges 102 is configured to collapse the temples 104A and 104B of eyeglasses 100 horizontally into the frame 106 to form a first folded configuration of eyeglasses 100, which is similar to a pair of folded conventional eyeglasses. As can be seen in FIG. 1A, the eyeglasses 100 is in a partially-folded configuration where a left hinge 102A of the first set of hinges 102 is in an unfolded configuration on a left temple 104A and a right hinge 102B is in a folded configuration on the right temple 104B. FIG. 1B shows a front view of the first folded configuration 108 of eyeglasses 100 when both of the temples 104A and 104B are properly folded at the corresponding hinges 102A and 102B in accordance with one embodiment of the invention. Eyeglasses 100 can include various types of vision-correction eyeglasses, sunglasses, among others.

As show in FIG. 1A, eyeglasses 100 also include a second set of hinges 110 including a pair of hinges 110A and 110B located substantially adjacent to the frame 106 of eyeglasses 100. In some embodiments, the second set of hinges 110 are part of the endpieces of eyeglasses 100. Embodiments of mechanism structure of hinges 110 are described below in conjunction with FIGS. 4 and 5. In the embodiment shown, hinges 110 are configured to rotate according to the directional arrows 120A and 120B to fold the temples 104A and 104B vertically downward from the first folded configuration 108 shown in FIG. 1A and FIG. 1B into a position below the frame 106 to form a second folded configuration.

Figure 2A:
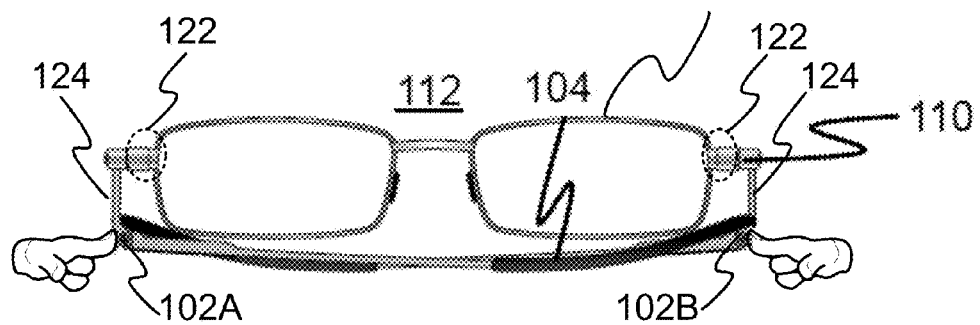
FIG. 2A shows the proposed eyeglasses being collapsed into a second folded configuration using the second set of hinges in accordance with one embodiment of the invention.

FIG. 2A shows eyeglasses 100 being collapsed into the second folded configuration 112 using the second set of hinges 110 in accordance with one embodiment of the invention. As can be seen in FIG. 2A, the second set of hinges 110 is positioned immediately adjacent to the frame 106 and in substantially the same plane as the frame 106 so that the temples 104 can fold downward to a position immediately below the frame 106 and in substantially the same plane as frame 106, creating an ultra-thin profile for set of folded eyeglasses with a minimal thickness.

Note that eyeglasses 100 include a pair of endpieces 122 attached to frame 106 for connecting temples 104 to frame 106. In some embodiments, the second set of hinges 110 can have cylindrical shapes to facilitate "rolling" or rotational motions. Accordingly, the endpieces 122 may include a cylindrical part to accommodate the cylindrical-shaped hinges 110. More specifically, the cylindrical-shaped hinges 110 may be inserted into the cylindrical part of the endpieces 122. When put together, the second set of hinges 110 and endpieces 122 form a combined pair of endpieces of eyeglasses 100 which is substantially in the same plane of frame 106. More detailed embodiments of the second set of hinges 110 and endpieces 122 are provided below in conjunction with FIGS. 4 and 5.

As can be seen in FIG. 2A, between the first set of hinges 102 and the second set of hinges 110 is a pair of straight sections 124. When eyeglasses 100 are unfolded at the first set of hinges 102, straight sections 124 are part of the temples 104, as shown in FIG. 1A. When eyeglasses 100 are folded by the first set of hinges 102, straight sections 124 create a predetermined space which keeps the folded temples 104 some distance away from the frame 106. Hence, when eyeglasses 100 are folded into the second folded configuration 112, as shown in FIG. 2A, the bottom of the frame 106 is positioned inside the space created by the straight sections 124 and the folded temples 104, without interfering with the temples 104. This configuration allows for a flat profile with a minimum thickness.

Figure 2B:
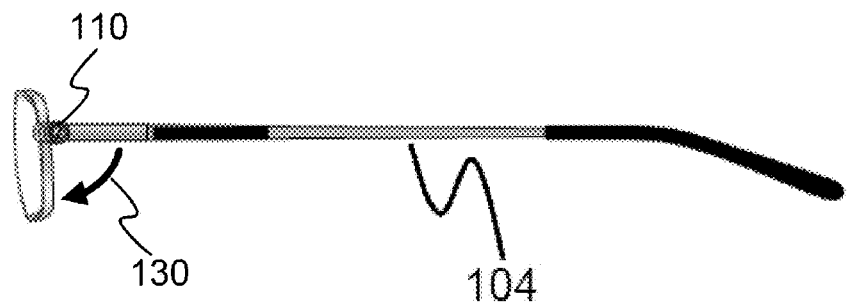
FIG. 2B shows a side-view of the proposed eyeglasses where the second set of hinges is in an unfolded configuration in accordance with one embodiment of the invention.
Figure 2C:
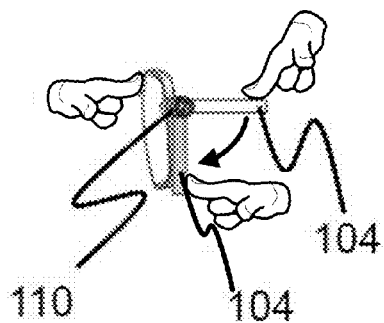
FIG. 2C shows a side-view of the proposed eyeglasses where the temples are rotated from the first folded configuration into the second folded configuration in accordance with one embodiment of the invention.

FIG. 2B shows a side-view of eyeglasses 100 where the second set of hinges 110 is in an unfolded configuration in accordance with one embodiment of the invention. In this embodiment, at least one of the first set of hinges 102 is also shown in the unfolded configuration. Also shown in FIG. 2B is the direction of rotation of the second set of hinges 110 by an arrow 130. FIG. 2C shows a side-view of eyeglasses 100 where the temples 104 are rotated from the first folded configuration 108 into the second folded configuration 112 in accordance with one embodiment of the invention. In this embodiment, eyeglasses 100 are in the first folded configuration 108 prior to the folding movement. FIG. 2C also illustrates the motion of the temples 104 from the first folded configuration 108 to the second folded configuration 112 as the temples 104 pivot around the second set of hinges 110. As discussed above, FIG. 2A illustrates a front-view of the eyeglasses 100 in the second folded configuration 112 where the temples 104 have been folded down and approximately below the frames 106. In some embodiments, the second set of hinges may be rolling hinges made of cylindrical parts which provide a simple rolling motion of the temples without creating any separated or sharp edges between the separated parts.

Sprint-Loaded Swine Down Hinges

Figure 3A:
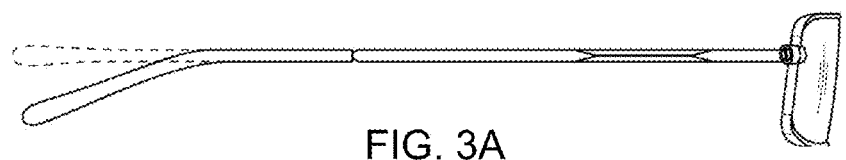
FIG. 3A illustrates a left side-view schematic of the exemplary eyeglasses in an unfolded configuration in accordance with one embodiment of the invention.
Figure 3B:
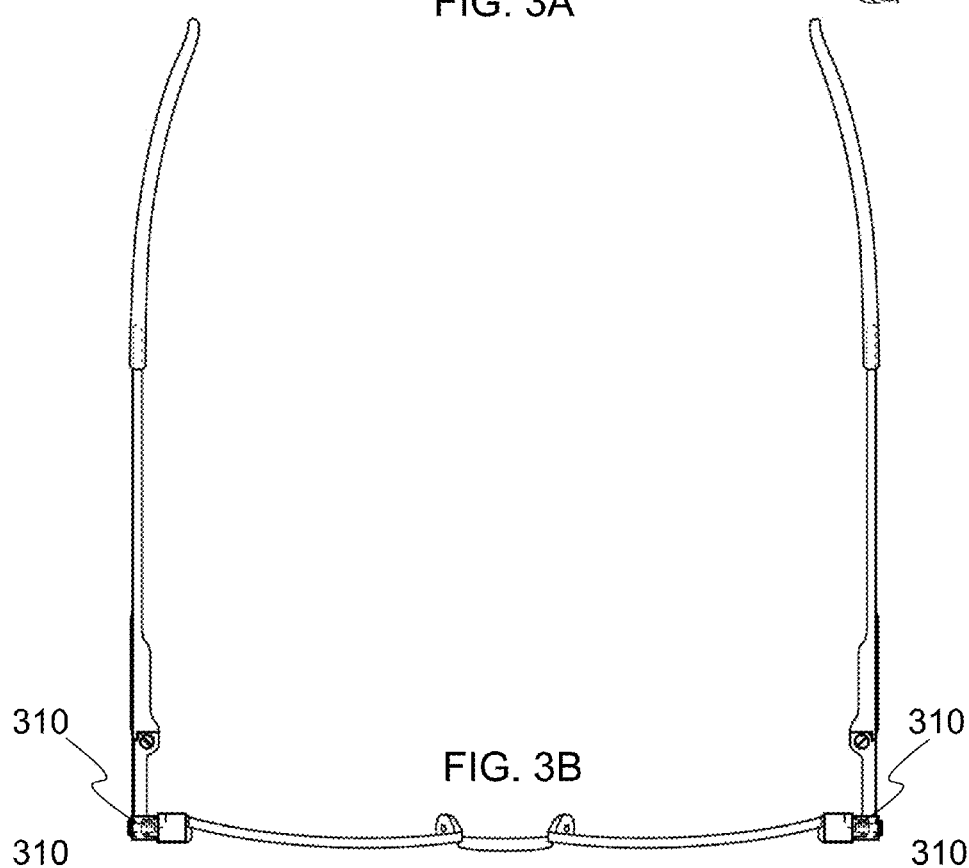
FIG. 3B illustrates a top-down-view schematic of the exemplary eyeglasses in an unfolded configuration in accordance with one embodiment of the invention.
Figure 3C:
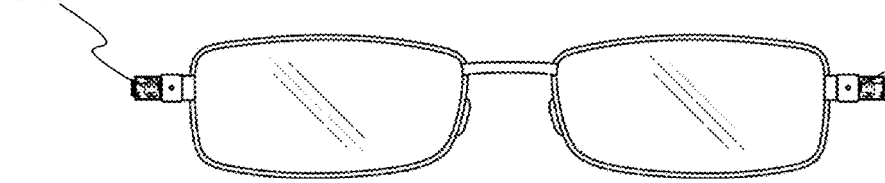
FIG. 3C illustrates a front-view schematic of the exemplary eyeglasses in accordance with one embodiment of the invention.
Figure 3D:
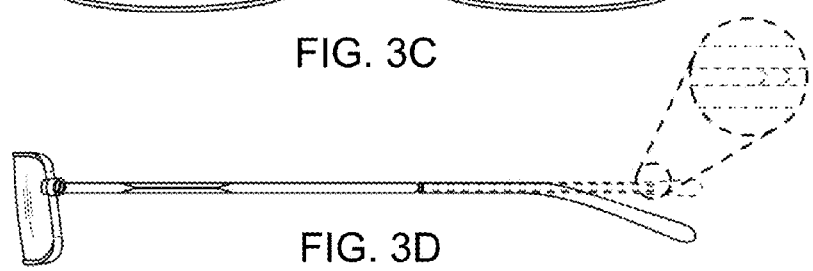
FIG. 3D illustrates right side-view schematic of the exemplary eyeglasses in the unfolded configuration in accordance with one embodiment of the invention.

FIGS. 3A-3D illustrate multiple viewing-angle schematics of a more detailed design of the proposed eyeglasses having two sets of hinges in accordance with one embodiment of the invention. More specifically, FIG. 3A illustrates a left side-view schematic of the exemplary eyeglasses in an unfolded configuration in accordance with one embodiment of the invention. More specifically, FIG. 3A shows a set of design parameters of the temples of the exemplary eyeglasses. FIG. 3B illustrates a top-down-view schematic of the exemplary eyeglasses in an unfolded configuration in accordance with one embodiment of the invention. More specifically, FIG. 3B shows various design parameters of the temples, the two pairs of hinges, and the bridge of the exemplary eyeglasses. Notably, the location of the second set of hinges 310 is immediately adjacent the rim of the lenses, so that the hinges 310 become part of the end pieces of the eyeglasses. FIG. 3C illustrates a front-view schematic of the exemplary eyeglasses in accordance with one embodiment of the invention. More specifically, FIG. 3C shows various design parameters of the frame of the exemplary eyeglasses. FIG. 3D illustrates a right side-view schematic of the exemplary eyeglasses in the unfolded configuration in accordance with one embodiment of the invention. More specifically, FIG. 3D shows additional design parameters of the temples of the exemplary eyeglasses.

In some embodiments such as the embodiment illustrated in FIGS. 3B and 3C, the second set of hinges 310 are shown to include a rolling hinge and a tension spring, so that the hinges 310 are inclined to remain in an unfolded configuration. To place the hinges 310 into the second folded configuration, one applies force to the hinges via downward pressure on the temples of the eyeglasses (as discussed above in conjunction with FIGS. 2B and 2C). In this manner, the eyeglasses are configured to function in conjunction with a collapsible case (described below) such that a lid of the case can be collapsed down onto the temples of the eyeglasses in the first folded configuration to force the second set of hinges to fold the temples into the second folded configuration as the case is closed. This results in a closed case with a minimal thickness, as shown and illustrated below.

An additional benefit of the spring-loaded second set of hinges includes that the eyeglasses are more comfortable and easier to wear for the user because the springs ensure that the temples remain in the unfolded configuration when being worn. Without these tension springs, the frame or temples may rotate while the user is wearing the eyeglasses, resulting in unwanted movement of the eyeglasses when being worn. In some embodiments, the springs in the hinges are configured to only allow the hinges to rotate approximately 90 (e.g., a few degrees more or less than 90 degrees) so that when in the second folded configuration, the temples are positioned immediately below or at the bottom of the frame. This design results in an ideal folded position with the smallest potential thickness of the eyeglasses, while providing the benefit of not allowing the temples to over-rotate past the plane of the frame into a position forward of the lenses and frame. Additional rotation may cause the eyeglasses to rotate into an unsafe or unstable position that may cause the temples or hinges to break, or may cause damage to the lenses by having the lenses in contact with the temples.

FIG. 4 illustrates an exemplary mechanical structure of the endpiece of a pair of proposed eyeglasses 400 which includes a rolling hinge as part of the endpiece in accordance with one embodiment of the invention. As illustrated in FIG. 4, the rim 402 of the eyeglasses 400 includes a rim lock 404 for securely locking rim 402 around a lens (not shown). Also shown in FIG. 4 is an endpiece 408 which comprises a set of subcomponents, including a rolling hinge, which is an embodiment of the proposed second set of hinges. More specifically, endpiece 408 includes a part 410 for attaching endpiece 408 to rim 402. Part 410 further includes an attachment part 410A that has a flat notch for connecting the endpiece 408 with the front side of the rim 402. Part 410 also includes a cylindrical part 410B containing a threaded borehole for receiving a screw 412 (described later). Endpiece 408 includes a tension spring 414 as part of the rolling hinge. As can be seen in FIG. 4, tension spring 414 has a slightly larger diameter than the diameter of the cylindrical part 410B so that the spring can be snugly fitted onto cylindrical part 410B. Endpiece 408 also includes a cylindrical tube 416 of a greater diameter than the tension spring 414. Cylindrical tube 416 can be jointed with part 410, such as through the attachment part 410A, to form the stationary part of the rolling hinge.

Endpiece 408 additionally includes a rolling tube 418 which is also part of the rolling hinge. As can be seen in FIG. 4, rolling tube 418 is also attached to the end of temple 420 of the eyeglasses. As such, rolling tube 418 provides attachment mechanism between temple 420 and endpiece 408 so that the rolling hinge can be rotated by applying pressure on temple 420. When the endpiece 408 is assembled, tension spring 414 is contained by rolling tube 418, which itself can partial slide into cylindrical tube 416. The entire structure is held together by screw 412 which goes inside cylindrical part 410B. More specifically, the threaded part of screw 412 passes through both tension spring 414 and rolling tube 418 before entering the borehole of cylindrical part 410B. The right opening of the rolling tube 418 is configured slightly larger than the diameter of the threaded part of screw 412 but smaller than the head of screw 412. Hence, after tightening, the head of screw 412 is stopped by the entrance of the rolling tube 418.

Rolling tube 418 and tension spring 414, which is largely positioned inside rolling tube 418, form the rotary part of the rolling hinge. More specifically, when assembled, the rotatory part of the rolling hinge comprising rolling tube 418 and tension spring 414 is physically confined by the stationary part of the rolling hinge comprising cylindrical part 410B, screw 412 and cylindrical tube 416 so that the rotatory part is allowed to rotate around the axis of the assembly but not able to displace horizontally. The tension inside the rolling hinge can be created by securely attaching one end of tension spring 414 (e.g., using the extended end of the spring 414 shown in FIG. 4) to the stationary part of the rolling hinge while allowing the rest of the tension spring 414 to rotate along with the rolling rube 418. In some embodiments, the tension spring is attached to the stationary part of the rolling hinge by being fitted inside a grove which is cut into the surface of the cylindrical part 410B of the stationary part. To create the situation where the temple 420 of the eyeglasses remains in the unfolded configuration when being worn, tension spring 414 is configured in a relaxed state when the temple 420 is fully unfolded as shown in FIG. 4. Note that the exemplary design of eyeglasses 400 provides one embodiment of the second set of hinges, but many other variations of endpiece 408 are possible to form a rolling hinge to create the proposed second set of hinges.

Figure 5:
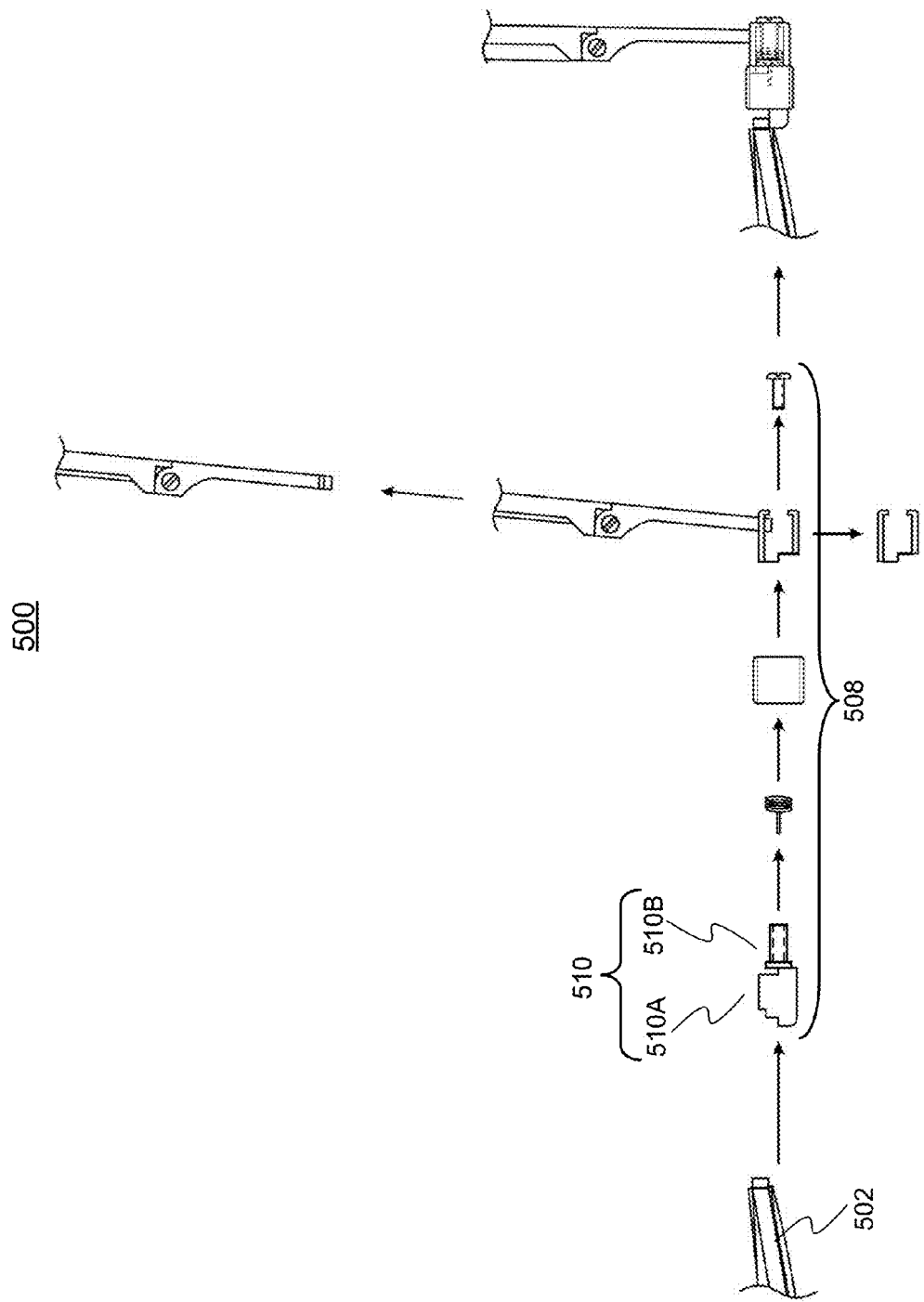
FIG. 5 illustrates another exemplary mechanical structure of the endpiece of a pair of proposed eyeglasses which includes a rolling hinge as part of the endpiece in accordance with one embodiment of the invention.

FIG. 5 illustrates another exemplary mechanical structure of the endpiece of a pair of proposed eyeglasses 500 which includes a rolling hinge as part of the endpiece in accordance with one embodiment of the invention. One main difference between eyeglasses 400 and eyeglasses 500 is that eyeglasses 500 do not include a rim lock. Examples of such eyeglasses include rimless eyeglasses. One noticeable difference in eyeglasses 500 is that attachment part 510A has different notch configuration than attachment part 410A in eyeglasses 400 for attaching endpiece 508 to the rimless lens 502.

Collapsible Case

Figure 6A:
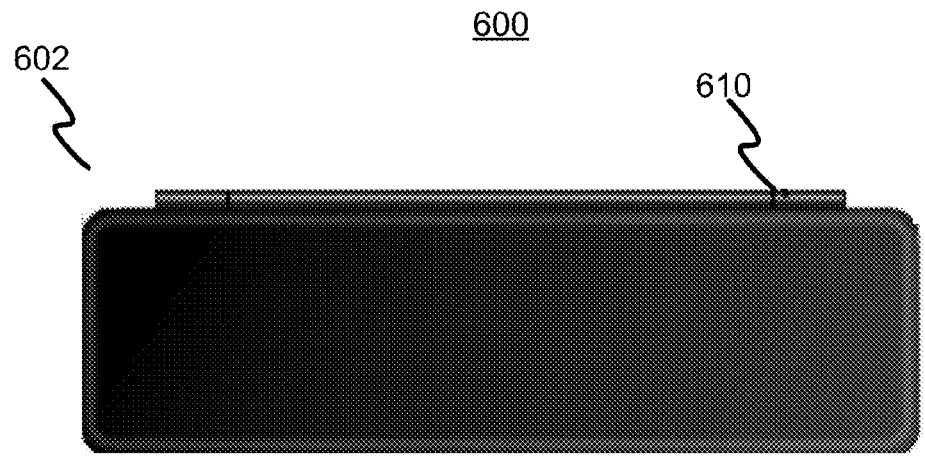
FIG. 6A illustrates a top-view of a foldable eyeglasses case in a closed configuration to be used with the proposed eyeglasses in accordance with one embodiment of the invention.
Figure 6B:
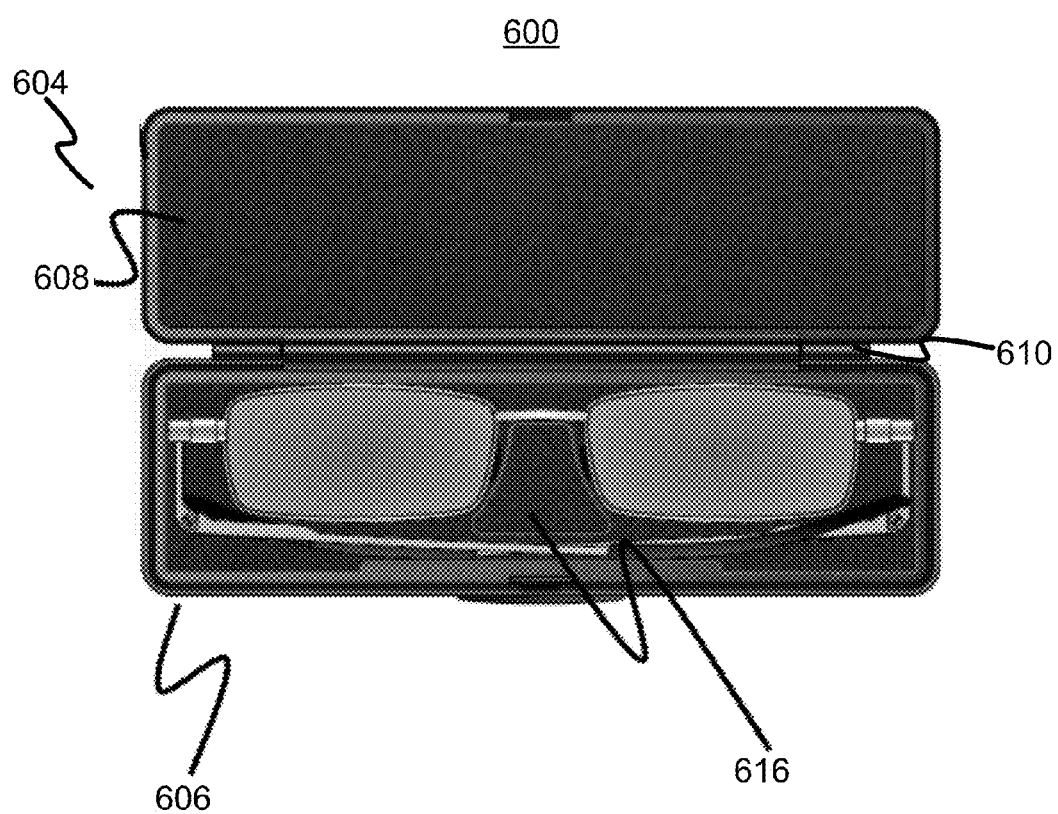
FIG. 6B illustrates a top-view of the ultra-compact collapsible case in an open configuration in accordance with one embodiment of the invention.
Figure 6C:
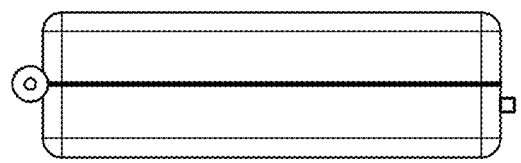
FIG. 6C illustrates a side-view of the ultra-compact collapsible case in the closed configuration in accordance with one embodiment of the invention.

In one embodiment, the proposed dual-hinged foldable eyeglasses operate to fold into the compact, second folded configuration with an ultra-thin profile which can be fitted inside an ultra-compact collapsible case. FIG. 6A illustrates a top-view of such an ultra-compact collapsible case 600 in a closed configuration 602 in accordance with one embodiment of the invention, while FIG. 6B illustrates a top-view of this ultra-compact collapsible case 600 in an open configuration 604 in accordance with one embodiment of the invention. As can be seen in FIG. 6B, the ultra-compact case includes a bottom portion 606 which holds the eyeglasses and a top cover 608 connected with the bottom portion 606 via a hinge 610. FIG. 6B also illustrates how the proposed eyeglasses fit into the bottom portion 606 in the above described second folded configuration. FIG. 6C illustrates a side-view of the ultra-compact collapsible case 600 in the closed configuration in accordance with one embodiment of the invention. It can be seen that case 600 has small dimensions when the eyeglasses are folded within.

Figure 6D:
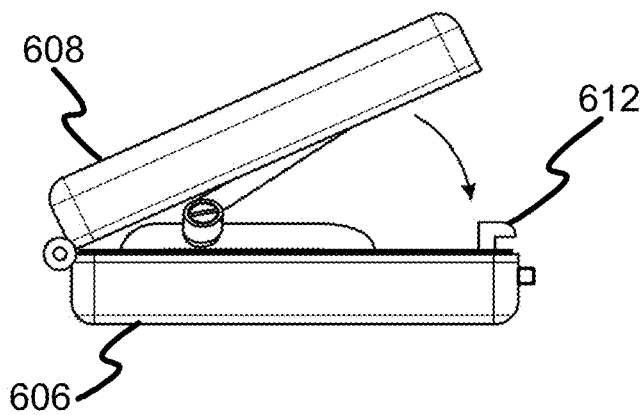
FIG. 6D provides a side-view illustration of the collapsible case being collapsed from the open configuration to the closed configuration with the pair of foldable eyeglasses contained therein.

FIG. 6D illustrates a designed function of the ultra-compact collapsible case 600 in conjunction with the proposed foldable eyeglasses. More specifically, FIG. 6D provides a side-view illustration of the collapsible case 600 being collapsed from the open configuration 604 to the closed configuration 602 with the pair of foldable eyeglasses contained therein. As can be seen in FIG. 6D, the case is used to fold the temples of the eyeglasses from the first folded configuration into the second folded configuration as the top cover 608 is being closed onto the bottom portion 606. In other words, the top cover 608 operates to rotate the second pair of hinges and fold the temples down into the plane of the lenses. The case 600 can then be secured into the closed configuration via a latch 612, which may be configured with an angled top front edge to help the top cover 608 easily slide forward and down over the latch 612 to create a secure closure.

In some embodiments, the dual-hinged eyeglasses can also be placed inside case 600 in the first folded configuration with the top of the frame and the temples of the eyeglasses facing down on the bottom portion 606. In this placement, the bottom of the frame is positioned upward as a result of the tension spring. To close the case, the top cover 608 of case 600 is used to fold the frame of the eyeglasses from the first folded configuration into the second folded configuration as the top cover 608 is being closed onto the bottom portion 606. In other words, the top cover 608 operates to rotate the second pair of hinges and fold the frame down into the plane of the temples.

Figure 6E:
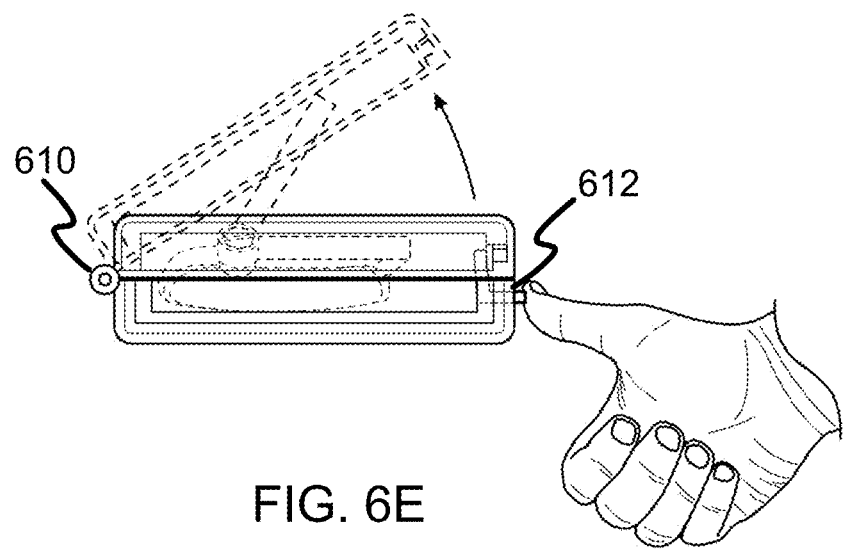
FIG. 6E provides a side-view illustration of the collapsible case being opened from the closed configuration to the open configuration by actuating the latch in accordance with one embodiment of the invention.

FIG. 6E illustrates a reverse operation of the one shown in FIG. 6D. More specifically, FIG. 6E provides a side-view illustration of the collapsible case 600 being opened from the closed configuration 602 to the open configuration 604 by actuating the latch 612 in accordance with one embodiment of the invention. In some embodiments, the hinge 610 of the collapsible case 600 and the second pair of hinges of the eyeglasses include tension springs, so that when the latch 612 is pressed, the tension springs operate to force the top cover 608 open and expand the temples of the eyeglasses from the second folded configuration to the first folded configuration. In other embodiments, only the second pair of hinges of the eyeglasses include tension springs but not in the hinge 610 of the collapsible case. In these embodiments, when the latch 612 is pressed, the tension springs of the eyeglasses also operate to force the top cover 608 open and expand the temples of the eyeglasses from the second folded configuration to the first folded configuration.

Referring back to FIG. 6B, the embodiment of the case 600 may also include a positioning element 616 which facilitates a user to position the eyeglasses inside the case in a desired position that allows the case to easily close onto the temples of the eyeglasses. The positioning element 616 can be formed as a raised element in the middle of the case which helps the user position the eyeglasses into the case such that the lenses are placed on opposing sides of the positioning element 616. This configuration also forces the user to place the eyeglasses into the case with the lenses and frames facing down, which allows for the top cover 604 of the case to more easily fold the eyeglasses into the second folded configuration by making contact with the temples of the eyeglasses as opposed to contacting the frame of the eyeglasses, which provides better protection for the frame and lenses. This configuration also allows the angle of closure of the top cover of the case to force the temples into their second folded configuration more easily in one direction.

Figure 7A:
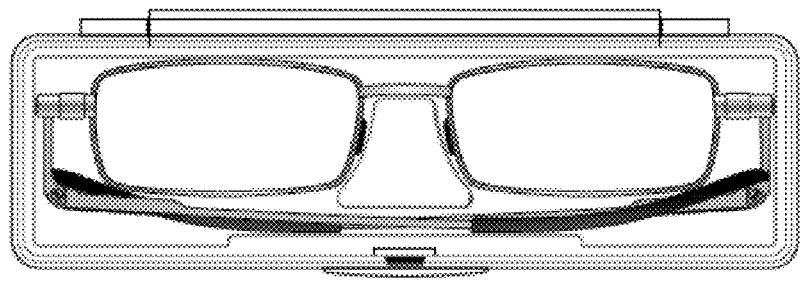
FIG. 7A is a top-down see-through illustration of the ultra-compact collapsible case in the closed configuration with the foldable eyeglasses inside in accordance with one embodiment of the invention.
Figure 7B:
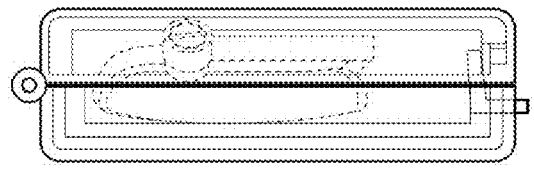
FIG. 7B is a side-view see-through illustration of the ultra-compact collapsible case in the closed configuration with the foldable eyeglasses inside in accordance with one embodiment of the invention.
Figure 7C:
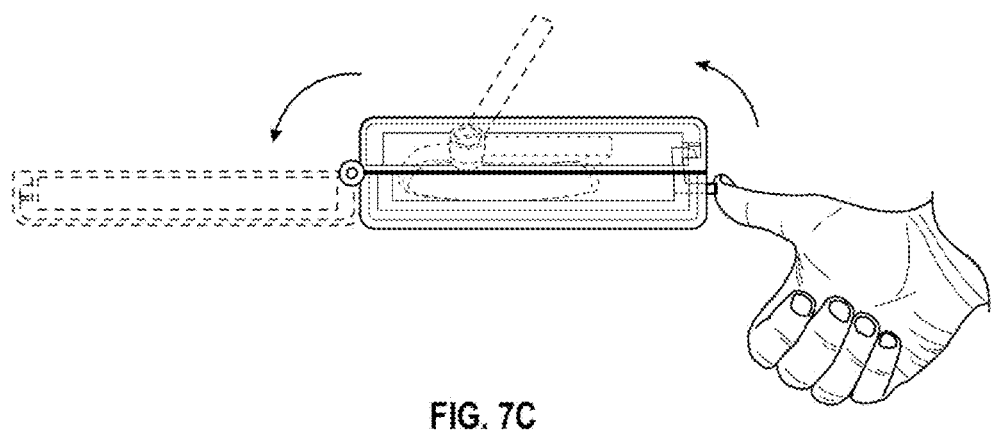
FIG. 7C is a side-view see-through illustration of how the opening of the case causes the eyeglasses to automatically assume the first folded configuration as a result of the tension springs in the second set of hinges in accordance with one embodiment of the invention.

FIG. 7A is a top-down see-through illustration of the ultra-compact collapsible case in the closed configuration with the foldable eyeglasses inside in accordance with one embodiment of the invention, while FIG. 7B is a side-view see-through illustration of the ultra-compact collapsible case in the closed configuration with the foldable eyeglasses inside in accordance with one embodiment of the invention. Finally, FIG. 7C is a side-view see-through illustration of how the opening of the case causes the eyeglasses to automatically assume the first folded configuration as a result of the tension springs in the second set of hinges in accordance with one embodiment of the invention.

As already described above, the collapsible case 600 includes latch 612 to hold the case in a closed position. In some embodiments, latch 612 is designed with a curved top surface and a clasp immediately underneath the curved top surface. This provides for a simple and smooth closing of the lid as the lid is being forced down onto the temples.

In some embodiments, hinge 610 on the collapsible case is a tension hinge, such as a plano hinge, which is provided to operate in conjunction with the spring tension in the rolling hinge of the second set of hinges on the glasses in order to allow the case to open and close with the expansion and contraction of the second set of hinges.

Figure 8:
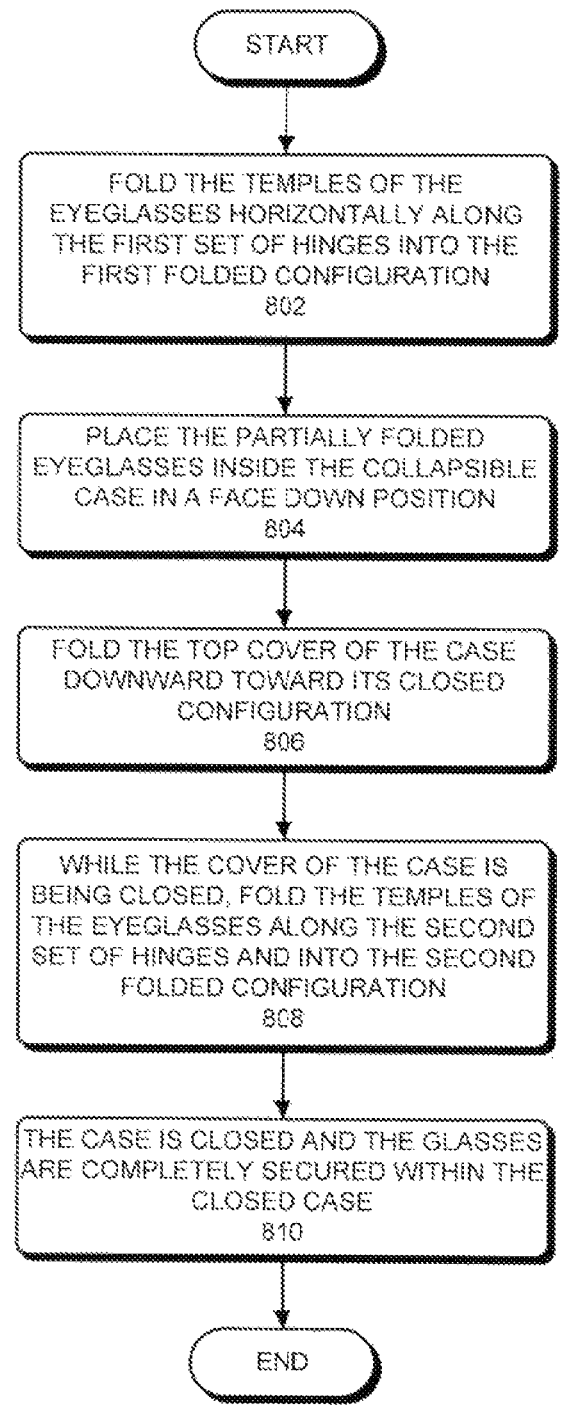
FIG. 8 provides a flowchart illustrating a process of folding the folded eyeglasses into the collapsible case for compact storage and easy carrying in accordance with one embodiment of the invention.

FIG. 8 provides a flowchart illustrating a process of folding the collapsible eyeglasses into the collapsible case for compact storage and easy carrying in accordance with one embodiment of the invention. During operation, the temples of the eyeglasses are folded horizontally along the first set of hinges into the first folded configuration (step 802). Next, the partially folded eyeglasses are placed inside the collapsible case in a face down position, such that the lenses and the frame are on the bottom of the case (step 804). Next, the top cover of the case is folded downward toward its closed configuration (step 806). While the cover of the case is being closed, the temples of the eyeglasses are folded along the second set of hinges and into the second folded configuration (step 808). Finally, the case is closed, for example, when the latch of the case is engaged and the glasses are completely secured within the closed case (step 810).

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A foldable eyeglasses and storage case assembly, comprising:
    a pair of foldable eyeglasses comprising a pair of lenses, a frame surrounding the pair of lenses and generally defining a plane of the eyeglasses, the frame having opposite outer edges, and a pair of temples extending from respective outer edges of the frame, wherein the pair of eyeglasses is in an unfolded configuration when the pair of eyeglasses is being worn by a user; and
    a collapsible storage case for holding the pair of foldable eyeglasses in a fully folded condition, the case comprising a bottom portion for holding the folded pair of eyeglasses and a top cover configured for movement between an open condition for removal or insertion of the pair of eyeglasses and a closed condition holding the pair of eyeglasses in the fully folded condition;
    each temple of the pair of eyeglasses having a first portion and a second portion, and a first pivot connection between the first and second portions defining a first pivot axis;
    a second pivot connection between the first portion of each temple of the pair of temples and the respective outer edge of the frame defining a second pivot axis perpendicular to the first pivot axis;
    wherein the first pivot axis is parallel to and spaced from the plane of the eyeglasses for folding the respective second portions of the pair of temples from the unfolded configuration substantially perpendicular to the plane of the eyeglasses and aligned with the respective first portions toward the frame into a first folded configuration in which the second portions are substantially parallel to the plane of the frame and the first portions of the temples remain unfolded and transverse to the folded second portions; and
    each second pivot axis extends outwardly from the respective outer edge of the frame for folding the first portions of the pair of temples vertically from the first folded configuration toward the frame into a second, fully folded configuration in which the first and second portions of the respective temples are substantially co-planar with the plane of the frame;
    each second pivot connection includes a tension spring which is configured to bias the respective first portion of the temple from the second, fully folded condition to the first folded configuration in which the first portions of the temples are unfolded; and
    a third pivot connection between the bottom portion of the collapsible storage case and the lid defining a third pivot axis for rotation of the top cover between the open and closed condition, and a latch for releasably securing the case in the closed condition with the pair of eyeglasses in the second fully folded condition with the folded temples facing outwards towards the top cover;
    whereby the tension springs at the second pivot connections are configured to bias the temples outwards to bear against the top cover of the case when in the closed condition with the temples in the fully folded condition and to bias the top cover of the case outwards into an open position when the latch is released.

2. The assembly of claim 1, wherein the first portion of the temple is configured with a length which is substantially equal to or greater than a distance between the second pivot axis and a bottom edge of the frame.

3. The assembly of claim 1, wherein folding the temples vertically from the first folded configuration toward the frame into the second folded configuration includes rotating the first portion of the temple around the second pivot axis by approximately 90 degrees.

4. The assembly of claim 1, wherein the top cover of the case operates to fold the foldable eyeglasses from the first folded configuration into the second folded configuration when the foldable eyeglasses are positioned in the bottom portion of the case in the first folded configuration with the temples facing outward and the top cover is closed onto the partially folded temples of the foldable eyeglasses.

5. The assembly of claim 1, wherein one or more tension springs are associated with the third pivot connection and are configured to bias the top cover into an open position in conjunction with the tension springs at the second pivot connections when the latch is released, whereby the top cover opens as the temples expand from the second folded configuration to the first folded configuration.

6. An end piece of a pair of foldable eyeglasses for connecting an outer edge of a rim of the eyeglasses to a temple of the eyeglasses, comprising:
 a stationary part which is affixed to the outer edge of the rim of the eyeglasses; and
 a rotatory part which is affixed to the temple of the eyeglasses and attached to the stationary part horizontally through an attachment mechanism, wherein the rotatory part includes a tension spring which inclines to keep the temple of the eyeglasses in an unfolded configuration when the eyeglasses is being worn by a user,
 the stationary part and the rotatory part forming a rolling hinge which is operable to fold the temple from the unfolded configuration vertically downward into a folded configuration such that the temple is substantially in the same plane as the rim of the eyeglasses; and
 wherein the stationary part further comprises:
 an attachment part for connecting the stationary part with the outer edge of the rim;
 a fastening part attached to the attachment part and containing a threaded borehole; and
 a first cylindrical tube attached to the attachment part such that the fastening part is substantially inside and coaxial with the first cylindrical tube.

7. The endpiece of claim 6, wherein the rotatory part further comprises:
 a second cylindrical tube attached to the temple of the eyeglasses at an outer surface of the second cylindrical tube; and
 the tension spring which is substantially positioned inside the second cylindrical tube and in contact with the inner surface of the second cylindrical tube which causes the tension spring to rotate along with the second cylindrical tube; and
 wherein the second cylindrical tube is substantially coaxial with the first cylindrical tube.

8. The endpiece of claim 7, wherein the tension spring includes an extended end which is securely attached to the stationary part of the rolling hinge.

9. The endpiece of claim 8, wherein the tension spring is attached to the stationary part of the rolling hinge by being fitted inside a grove cut into the surface of the fastening part of the stationary part.

10. The endpiece of claim 6, wherein the second cylindrical tube has a diameter which is smaller than the diameter of the first cylindrical tube and greater than the diameter of the fastening part, wherein the second cylindrical tube is partially inserted into a gap between the first cylindrical tube and the fastening part.

11. The endpiece of claim 6, wherein the attachment mechanism includes a screw which passes through the tension spring and the second cylindrical tube and threaded into the threaded borehole of the fastening part, wherein the screw is coaxial with both the first cylindrical tube and the second cylindrical to facilitate the rotatory part of the rolling hinge to smoothly rotate around the stationary part of the rolling hinge.

12. The endpiece of claim 11, wherein the head of the screw has a diameter greater than a diameter of an end opening of the second cylindrical tube so that the head of the screw is stopped by the end opening of the second cylindrical tube.

13. The endpiece of claim 12, wherein the head of the screw is substantially flushed with the surface of the end opening of the second cylindrical tube.

14. The endpiece of claim 6, wherein the stationary part is affixed to the outer edge of the rim at the front side of the outer edge of the rim.

15. The endpiece of claim 6, wherein the rolling hinge is operable to fold the temple from the unfolded configuration vertically downward into the folded configuration by rotating the rotatory part around the stationary part by approximately 90 degrees.

16. The endpiece of claim 6, wherein the rim includes a rim lock.

17. The endpiece of claim 6, wherein the rim does not include a rim lock.

* * * * *